US006782036B1

(12) United States Patent
Dowling et al.

(10) Patent No.: US 6,782,036 B1
(45) Date of Patent: Aug. 24, 2004

(54) SMART ANTENNA MULTIUSER DETECTOR

(75) Inventors: Eric M. Dowling, Holmes Beach, FL (US); Umesh Jani, Richardson, TX (US); Richard M. Golden, Plano, TX (US); Zifei Wang, Thousand Oaks, CA (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 09/578,288

(22) Filed: May 25, 2000

Related U.S. Application Data

(60) Provisional application No. 60/136,075, filed on May 26, 1999.

(51) Int. Cl.$^7$ ................................................ H04B 1/69
(52) U.S. Cl. ...................................... 375/130; 375/130
(58) Field of Search ................................ 375/200, 346, 375/148, 267, 147, 221, 144, 231, 130, 340, 219; 370/280, 334, 335, 203; 395/200.63, 200.81; 455/562.1; 342/378, 450, 457, 172

(56) References Cited

U.S. PATENT DOCUMENTS

| | | | |
|---|---|---|---|
| 5,343,496 A | 8/1994 | Honig et al. .................... 375/1 |
| 5,363,403 A | 11/1994 | Schilling et al. ................ 375/1 |
| 5,481,533 A | 1/1996 | Honig et al. .................... 370/18 |
| 5,553,062 A | 9/1996 | Schilling et al. ............... 370/18 |
| 5,572,552 A | 11/1996 | Dent et al. ..................... 375/343 |
| 5,621,752 A | * 4/1997 | Antonio et al. ............... 375/144 |
| 5,629,929 A | 5/1997 | Blanchard et al. ........... 370/201 |
| 5,644,592 A | 7/1997 | Divsalar et al. .............. 375/206 |
| 5,671,247 A | 9/1997 | Souissi et al. ............... 375/200 |
| 5,680,419 A | 10/1997 | Bottomley .................... 375/347 |
| 5,687,162 A | 11/1997 | Yoshida et al. .............. 370/203 |
| 5,719,852 A | 2/1998 | Schilling et al. ............ 370/201 |
| 5,812,786 A | * 9/1998 | Seazholtz et al. ........... 709/233 |
| 5,933,446 A | * 8/1999 | Bond et al. ................... 375/130 |
| 6,064,338 A | * 5/2000 | Kobayakawa et al. ....... 342/378 |
| 6,108,565 A | * 8/2000 | Scherzer .................... 455/562.1 |
| 6,122,260 A | * 9/2000 | Liu et al. ..................... 370/280 |

OTHER PUBLICATIONS

Adaptive bilinear inverse filtering Ahmed, H.M.; Rauf, F.; Acoustics, Speech, and Signal Processing, 1992. ICASSP–92., 1992 IEEE International Conference on , vol.: 4, 23–26.*
Stochastic conjugate gradient constant modulus blind equalizer for wireless communications Wang, Z.; Dowling, E.M.; Communications, 1996. ICC 96, Conference Record, Converging Technologies for Tomorrow's Applications. 1996 IEEE.*
Block–Shanno multi–user constant modulus algorithm for use in multi–user CDMA environment Arasaratnam, P.; Zhu, S.; Constantinides, A.G.; Electronics Letters, vol.: 38 Issue: 9, Apr. 25, 2002.*
Zifei Wang and Eric M. Dowling, "Block Shanno Constant Modulus Algorithm for Wireless Equalizations," ILASSP, 1996, pp. 2678–2681.

* cited by examiner

*Primary Examiner*—Stephen Chin
*Assistant Examiner*—Ted Wang
(74) *Attorney, Agent, or Firm*—Gardere Wynne Sewell LLP

(57) ABSTRACT

The present invention provides a processing apparatus and methods for the extraction of user information streams from a composite CDMA waveform. The apparatus and methods increase CDMA system capacity by orthogonalizing an individual user's signal from thermal noise components, multi-access interference, and spatially diverse but non-orthogonal coded components. The present invention exploits both the temporal diversity and the spatial diversity present in the received composite CDMA waveform to increase performance. The smart antenna multiuser detector makes use of blind-block-adaptive nonlinear optimization strategies, which are used to separate user signal components from a composite CDMA waveform by jointly processing in both a chip (code) and spatial domain.

29 Claims, 5 Drawing Sheets

SMART ANTENNA MULTIUSER DETECTOR

This application claims priority under 35 U.S.C. §119(e)(1) of provisional patent application No. 60/136,075 filed May 26, 1999.

TECHNICAL FIELD OF THE INVENTION

The present invention relates, in general, to the field of processing of signals received from a sensor array and, in particular, to a smart antenna system for separating and reconstructing a symbol stream generated by an individual user in a code division multiple access (CDMA) communication system.

BACKGROUND OF THE INVENTION

Without limiting the scope of the invention, its background is described in connection with code division multiple access telecommunication devices and systems, as an example.

Heretofore, in this field, a user using a wireless handset transmits information from the handset to a base station. In commercial applications the wireless handset is most commonly a cellular phone or a personal communication system (PCS) phone. In military and other applications involving wireless transmission, the wireless handset may be generally be any mobile radio apparatus such as a spread spectrum transceiver or a mobile satellite terminal. A communication protocol used to transmit and receive wireless signals between the wireless handset and the base station is called an air interface. The air interface is typically agreed upon by an international standards committee.

Common air interface standards include analog service, time division multiple access (TDMA) and code division multiple access (CDMA). The most common CDMA air interface is called IS-95, based on the ITU-T IS-95 standard. CDMA technology and related spread spectrum coding techniques are discussed in detail in the ITU-T IS-95 standard, and in a variety of communications technology references. These references are useful in providing a systems level understanding of CDMA and emerging wideband-CDMA (W-CDMA) technologies.

Within CDMA and WCDMA applications, certain spread spectrum processing occurs at an inner spreading layer within the spread spectrum coding architecture. For example, a reverse channel (uplink) of one type of W-CDMA system includes a pair of in-phase(I) and quadrature(Q) outer-layer long codes and an inner layer orthogonal code. The orthogonal code has 64 chips per symbol. Depending on a particular system architecture, an inner-layer orthogonal code is typically 64 chips long and repeats every symbol. An outer layer long code and/or short code in a given CDMA system are de-spread, prior to de-spreading the orthogonal code. Hereafter, reference to a user's spreading code indicates the user's orthogonal code as found at an inner layer of a layered CDMA coding architecture.

A wireless communications antenna is commonly sectorized; each sector utilizing a portion of the operational frequency spectrum. Sectorization provides various functionalities to system operators and mobile units; frequency re-use amongst different sectors being a primary concern of system operators. Technologies such as CDMA allow "sharing" of a sector's frequency spectrum by multiple mobile units.

While CDMA is effective at increasing the capacity of wireless systems when compared to analog and TDMA (time division multiple access) technologies, there is increasing demand to further increase capacity. Increased capacity means more users can be serviced using with same amount of frequency spectrum resources in a given geographical area.

One method of increasing capacity is to use a smart antenna system. In general, a smart antenna system may rely on a time-varying beam pattern instead of sectorization. Conventional techniques generally use spatial filtering to separate communication signals by exploiting diversity in the spatial coordinates of their sources. Some methods, such as those based upon beamformer algorithms, make use of a signal propagation model which directly incorporates direction of arrival information. However, current beamformer approaches are limited in the number of beams which can be formed by an antenna array with a fixed number of antennas. Similarly, matrix based signal copy algorithms such as those derived from eigenstructure-oriented direction finding techniques are limited in the number of signals they can resolve for a fixed number of antennas, are sensitive to modeling errors, and have difficulty in effectively dealing with multipath signals.

One class of conventional antenna system utilizes a front end spatial beam-steering processor coupled to a standard receiver, such as a "rake" receiver (RAKE). Some systems of this class are generally categorized as switched beam systems. Switched beam systems (SBS) are similar to antennas having fixed and sectorized fields of view, but fields of view in a SBS are typically more directive and may be electronically "steered" in response to system loading conditions. Other systems of this class are generally categorized as adaptive arrays.

Adaptive arrays form individual beams to isolate a signal due to a particular user. Conventional adaptive arrays generally perform adaptive spatial filtering to isolate a user's signal, and then pass this spatially-filtered signal to a downstream processor for de-spreading and equalization. Such a system may use an architecture which requires a bank of correlators for each multi-path of each user's signal received from each antenna. Outputs of the correlator banks are processed by RAKE beam-formers. Such architecture makes modeling assumptions about the array pattern, which can lead to performance degradations due to modeling error sensitivity.

Recently, a diversity-reception antenna system has integrated CDMA interference suppression, noise suppression, and multipath interference suppression into a signal optimized structure. The system uses an orthogonalizing adaptive filtering approach which performs decision-directed MMSE (minimum mean squared error) updating. This system is applied with a diversity combiner which is used to add together outputs of various diversity paths to form a decision statistic. Individual paths are adapted either individually or collectively based upon the most reliable path, depending on the embodiment.

While such a system provides a diversity-reception device based upon orthogonalizing filters, characteristics of the approach are undesirable. Decision-directed adaptation often becomes unreliable and fails and under severe interference conditions. Also, these systems involve sub-optimal diversity combining and do not perform jointly optimized space-time processing. All adaptive optimization is performed in the time domain to orthogonalize user signals, but no joint-spatial adaptive processing is employed which also orthogonalizes a desired signal from interference in the spatial domain.

Such approaches can be improved upon using various block-adaptive algorithms together with fully blind cost functions. Block-adaptive algorithms may involve, for example, a block-gradient descent algorithm, a block conjugate-gradient algorithm, a block-Gauss-Newton algorithm, or a block-Shanno algorithm. In general, a block-nonlinear optimization algorithm may be used to cause a CDMA user signal to be demodulated, so as to minimize a nonlinear objective function, such as a constant-modulus error function. Thus, reduced bit errors rates may be achieved across a broad range of signal and interference scenarios with a lower computational complexity as compared with the previous approach.

Conventional antenna array signal processors, based on a constant modulus algorithm (CMA), typically involve a spatial-domain set of parameters which are adapted to cause a demodulated signal to have a constant modulus. Some algorithms of the CMA array type involve a space-time beam-former structure having both space domain and temporal domain taps. However, these methods generally serve as front end processors and do not provide orthogonalizing structures for isolating CDMA signals in both a chip-domain and a spatial-domain.

Another conventional approach involves "subtractive CDMA". In subtractive CDMA, a user's signal power is deduced. When a symbol decision is made based on a user's signal having strong power, the symbol decision is re-spread, weighted, time-aligned, and subtracted from the composite CDMA waveform. This allows a weak signal to be recovered with higher reliability when received in the presence of strong interference from another user's signal; providing a degree of near-far resistance by reducing the effect of a near (high dower) user's signal on the reception of a far (low power) user's signal. However, subtractive CDMA suffers in performance because at the receiver, a user's spreading code has undergone channel distortion and/or synchronization-related distortion, and is thus not orthogonal to all other user's signals. Hence, subtracting a very powerful user's spreading code can reduce signal strength of a weaker signal, thereby causing a degradation in overall performance.

In a present subtractive CDMA system for use with smart antenna systems, a plurality of versions of a composite CDMA waveform are received from a plurality of antennas. A matrix containing these signals is stored and a two-dimensional transform is computed to separate individual users' signals in time based upon their spreading codes, and in space based upon a set of beam patterns. This transform produces a two-dimensional matrix whose $(i,j)^{th}$ element corresponds to a demodulated output related to the $i^{th}$ user's spreading code as viewed from the $j^{th}$ beam. The $(i,j)^{th}$ element of the transformed matrix with the largest norm is then used to form a decision for the $i^{th}$ user. Next, the $(i,j)^{th}$ element of the transformed matrix is set to zero (i.e., a subtraction), and the transformed matrix is then inverse transformed. This creates a new input matrix whose strongest signal component has already been decoded in both space and time and has been removed. Using this new input matrix, the process is repeated. While overcoming some limitations of other methods, this method is quite costly; requiring computation of the forward and reverse two-dimensional transforms for each user. Also, this method does not address the fact that the spreading codes of the users undergo distortion and therefore involve non-orthogonal components. Fixed beams are used in the antenna processing and therefore non-optimal spatial orthogonalization is achieved.

A need has therefore arisen for a smart antenna system which overcomes the aforementioned limitations of conventional systems. A need has arisen for a space-time processor architecture which is able to more selectively separate (orthogonalize) user signals using an approach which is not prone to modeling errors. A need has further arisen for an architecture which does not need to form explicitly one beam for each multi-path of each user, but is able to jointly and optimally separate user signals in space and time using a single orthogonalizing filter structure.

A need has also arisen for an architecture which is adapted to jointly orthogonalize a user CDMA waveform in both the chip-domain and the spatial-domain. A need has further arisen to have such an architecture without requiring expensive matrix operations such as singular-value decompositions or eigen decompositions.

Finally, a need has arisen for a subtractive CDMA system which could orthogonalize user components in both the chip-domain and the spatial domain, so as to reduce effects of having strong nonorthogonal components subtracted from and reducing the power of weak signals. A need has further arisen to provide such a system without increasing, and preferably decreasing, complexity.

SUMMARY OF THE INVENTION

The present invention solves these and other problems by providing a smart antenna system which can efficiently and jointly optimize sets of chip-domain and spatial-domain system parameters. The present invention provides a smart antenna apparatus that separates an individual user's signal from multi-access interference (MAI) and thermal noise, compensates multi-path fading effects, and discriminates user signals according to their directions of arrival.

The present invention is a continuation-in-part of a parent application filed on Jan. 4, 1999, Serial No. 60/114,637. The parent application is entitled "Adaptive Multiple Access Interference Suppression", and is herein incorporated by reference.

In the present invention, a smart antenna system extracts a user's data-symbol stream from a composite CDMA waveform. As used herein, a "composite CDMA waveform" is a signal at any layer of a CDMA coding hierarchy comprising a plurality of CDMA user signals. Various types of composite CDMA waveforms may be constructed according to the specific system modulation physical layer description. For example, some composite CDMA waveforms may involve additional types of modulations such as multi-carrier modulation. A space-chip processor structure according to the present invention provides low-cost means to orthogonalize a user's signal from interference components jointly, in a both a chip domain and spatial domain, using a block-adaptive nonlinear optimization algorithm.

As defined herein, "chip domain" is a vector space comprising the set of orthogonal code vectors as typically found at an inner layer of a spread spectrum coding architecture (e.g. $C^{64}$). "Spatial domain" is a vector space spanned by a set of vectors whose elements are derived from a plurality of antennas in a smart antenna system. In general, the spatial domain vectors must have elements from at least two different spatial sample points and may optionally include temporal elements as well. For example, each antenna may provide several output sample streams which have identical chip spacing but are staggered in time with respect to each other by a fractional chip.

The present invention provides a bilinear orthogonalizing filter system used to isolate an individual user's signal from a composite CDMA waveform. A bilinear orthogonalizing filter structure jointly orthogonalizes a user's signal from other user's signals in both the chip domain and the spatial domain.

Further, the present invention provides a system of smart antenna digital signal processing for CDMA signal detection. This system exploits additional degrees of freedom, increasing the range of a base station and the number of users which can be serviced under a fixed set of power and frequency resources. Improved subtractive CDMA multiuser detectors are also developed for single-antenna and smart-antenna systems.

In a preferred embodiment, this filter structure comprises a bilinear transformation. Preferably, a block-adaptive nonlinear optimization approach is used derive a set of chip domain parameters and a set of spatial domain parameters used in the bilinear orthogonalization. The present invention thereby provides an effective means to extract an individual user's signal from a composite CDMA waveform.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
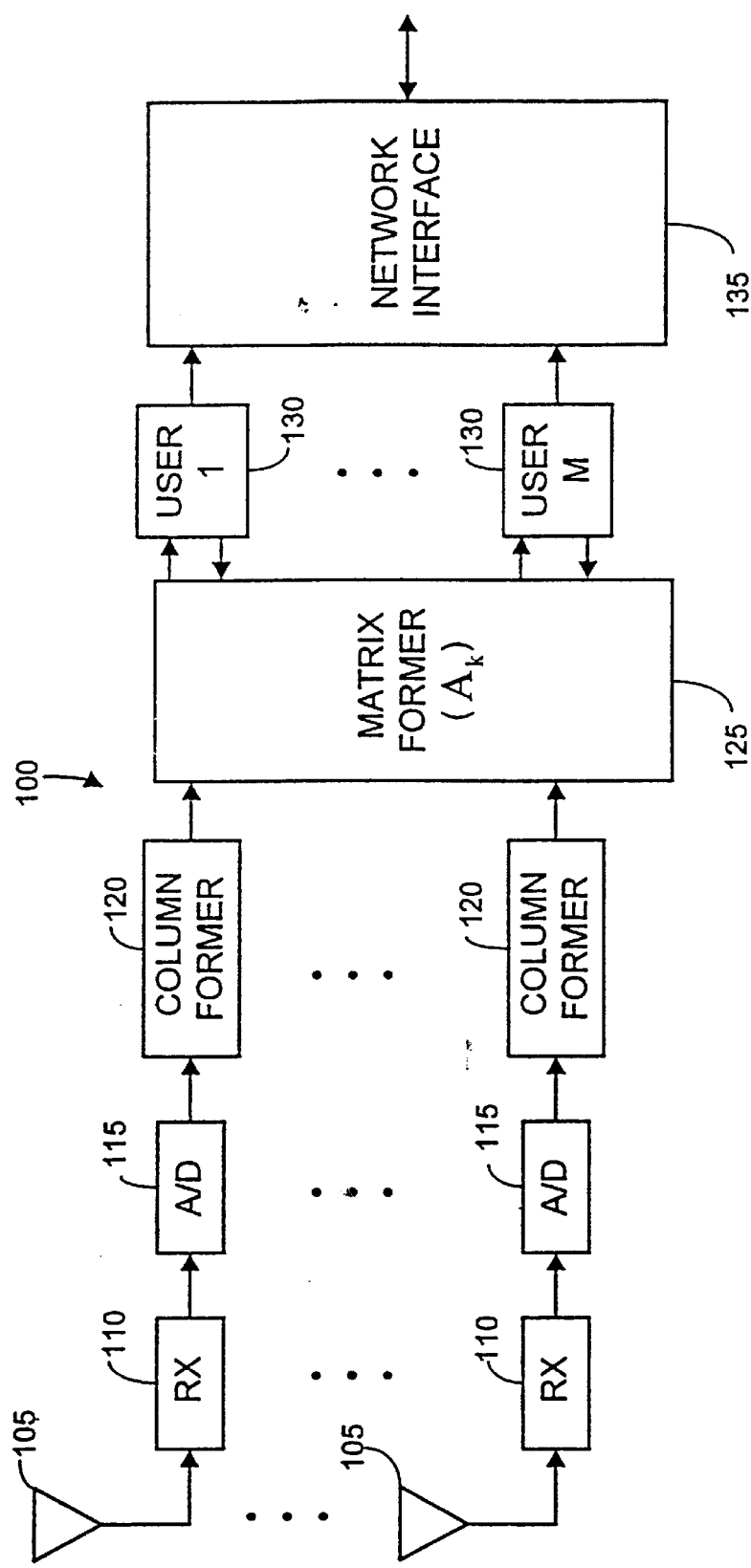
FIG. 1 is a block diagram representing an embodiment of a smart antenna based communications receiver according to the present invention.

Referring now to FIG. 1, a block diagram represents an embodiment of a communication receiver 100 according to the present invention. Receiver 100 includes a plurality of sensors 105. The sensors 105 may be implemented as radio frequency or microwave frequency antennas, such as those capable of receiving 900 MHz signals. The sensors 105 may optionally be acoustic sensors such as ultrasonic sensors, or may operate at any desired frequency of the electromagnetic spectrum. The output of each sensor 105 feeds to a receiver module 110. Receiver 110 is a device which converts a propagation signal received, via one of the sensors 105, to an intermediate frequency (IF) signal or a baseband frequency signal. In some cases, radio frequency signals may be sampled directly at the sensors 105 and converted to baseband using digital signal processing algorithms. In a preferred embodiment, receivers 110 each convert a radio frequency signal to a baseband signal using analog processing. In some embodiments, an outer layer of de-spreading is performed using one or more de-spreading circuits (not shown) in receiver 110.

The output of receiver 110 is transmitted to an analog-to-digital (A/D) converter module 115. In some systems, the receivers 110 output IF signals and the A/D converter modules 115 sample those IF signals. A digital signal processing algorithm is then employed to digitally convert the IF signals to baseband. Some filtering and signal conditioning may also be performed at IF within the A/D converter modules 115. In their most general form, the A/D converter modules 115 comprise analog-to-digital converter circuitry, and optionally, digital signal processing circuitry for IF-to-baseband signal transformations. As an example, a delta-sigma converter may be used.

Alternatively, receivers 110 may convert their input to baseband, such that A/D converters 115 sample a baseband signal directly. The outputs of the A/D converter modules 115 are baseband signals which are preferably sampled at the chip rate or higher. In general, the outputs of the A/D converter modules 115 may be real or complex signals involving in-phase and quadrature-phase components. For example, a CDMA system whose data symbols are modulated using binary-phase-shift keying (BPSK) will typically involve an A/D converter module 115 whose output is real; while a CDMA system whose data symbols are modulated using quadrature-phase-shift keying (QPSK) will involve an A/D converter module 115 whose output is complex. In various embodiments, other forms of real and complex modulations may also be used.

For purposes of illustration and explanation, the present invention will further be described in reference to data modulation in a W-CDMA reverse channel application. In a W-CDMA application, data is modulated using QPSK, and there is an inner-layer 64-chip-per-symbol Walsh code. Some W-CDMA applications also make use of offset-QPSK (OQPSK) modulation.

A set of signal samples are said to be "drawn from a sensor" if they are produced at the output of an A/D converter module 115 which is coupled to a sensor 105. Similarly, a composite CDMA waveform which is sampled in both the spatial and fractional chip domains is said to be "drawn from a plurality of sensors."

Generally, a portion of a composite CDMA waveform is temporarily stored in a data structure as a collection of space-chip samples while it is being processed. A collection of space-chip samples involves samples collected from different spatial sensors and at different fractional-chip sampling times. Also, as discussed hereafter, chip-rate sampling is a special case of fractional chip sampling. The portion of a composite CDMA waveform which is stored is typically a function of the number of symbol durations which constitute a block in block-adaptive processing as discussed hereafter.

Referring still to FIG. 1, digital outputs of A/D converter modules 115 are coupled to a set of column-submatrix formers 120. The column sub-matrix formers 120 generate one or more chip-domain column vectors. The chip domain column vectors are chip-domain data vectors which generally involve fractional-chip sampled vectors corresponding to a space defined by the inner-layer orthogonal code of the CDMA system. For example, in W-CDMA systems, pilot, traffic and information channels, each having their own orthogonal 64-chip orthogonal code vectors, are multiplexed onto in-phase(I) and quadrature(Q) data streams and are spread using I and Q pilot positive-negative (PN) spreading waveforms, which are in turn modulated to form a QPSK modulated waveform. In such a system, a column former 120 preferably de-spreads I and Q channel data with I and Q pilot PN sequences and de-multiplexes the pilot, traffic, and information channels' orthogonal code chip streams.

Column formers 120 then each form a column matrix for each channel. Although reference is now focused on only one of the demultiplexed channels, it should be understood that the present invention is generally applicable to any type of emerging CDMA coding architecture having at least one information stream with an inner-layer spreading code (e.g., 64 chips per symbol).

Formers 120 may form one vector (e.g., 64 chip-samples) per symbol period, or may alternatively form multiple column vectors. For example, if four samples per chip are collected by the A/D converter modules 115, then the formers 120 may be configured to each construct a submatrix comprising four column vectors. In this case, samples are spaced at the chip interval down the columns of the submatrix and at one forth the chip interval across the rows of the submatrix.

The outputs of formers 120 are coupled to a matrix former 125. In general, matrix former 125 associates elements drawn from separate sensors 105 into spatial-domain data vectors. In a preferred embodiment, matrix former 125 forms a system level matrix, coupling to one or more user-channel processors 130. When a matrix is constructed in this embodiment, the columns of the matrix comprise chip domain data vectors, and the rows of the matrix comprise spatial domain data vectors. The elements of the chip-domain and spatial domain data vectors are the same, while the vectors themselves are different. In a preferred embodiment, the output of the matrix former 125 is a space-chip data matrix, comprising a symbol duration worth of space-chip samples.

The outputs of processors 130 comprise extracted/estimated information streams, which replicate those transmitted to receiver 100. Typically, these information streams involve symbol streams and data streams transmitted by a user and extracted from a CDMA waveform. The symbol streams are generally inverse mapped to data streams in the user processor 130 to provide an extracted and recovered user's data (e.g., bit) stream. While the extracted data stream replicates that transmitted to the receiver 100, bit errors may occur. These information streams are typically coupled to a network interface 135 such as a digital multiplexer interface to a telephone system or an access concentrator interface to a packet switched network.

Figure 2:
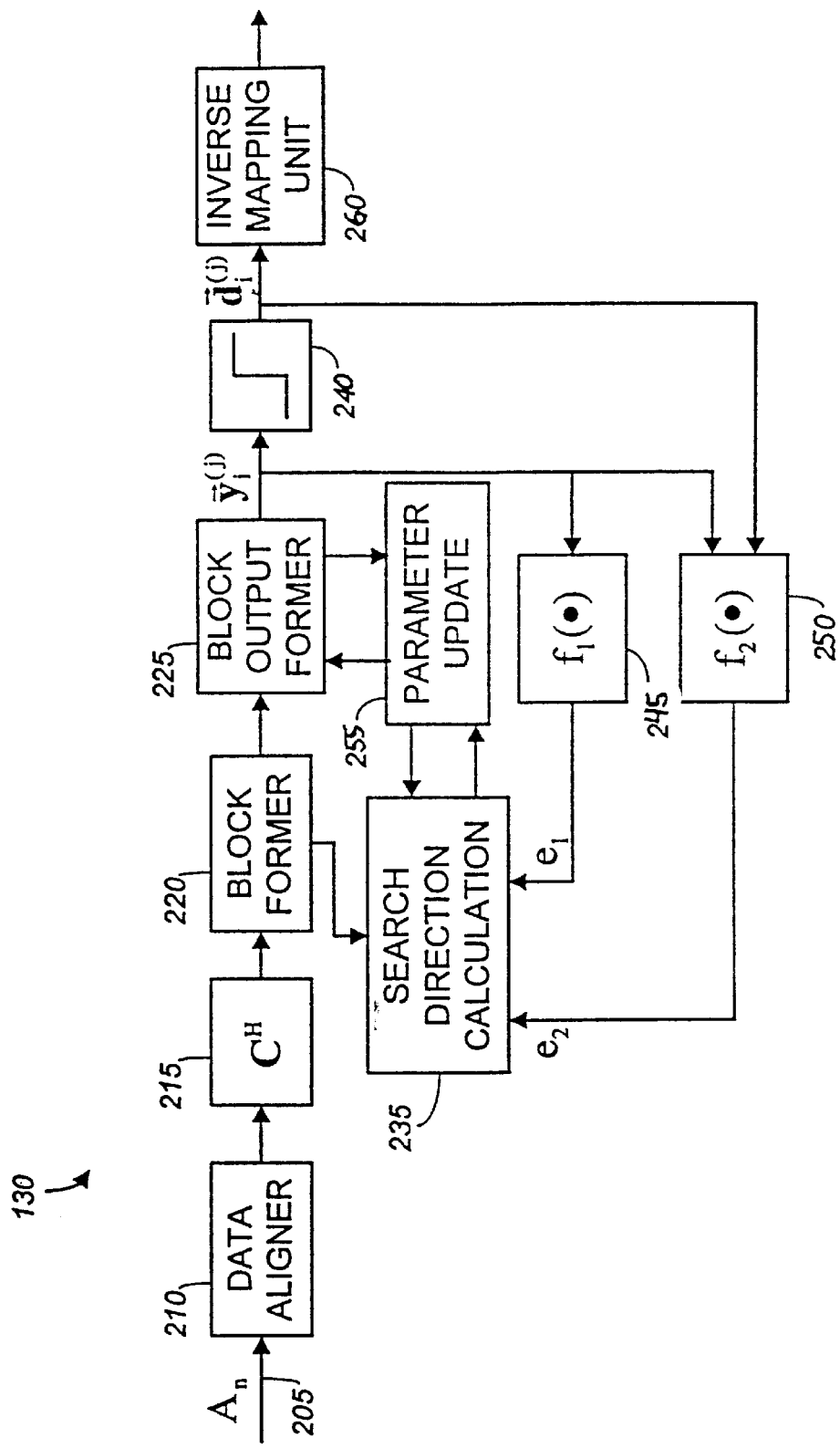
FIG. 2 is a block diagram representing an embodiment of a user-channel processor for use primarily within a communications receiver according to the present invention.

Referring now to FIG. 2, a user-channel processor 130 is illustrated. An input matrix $A_n$ is received via an input coupling 205. The input coupling 205 receives information related to the matrix $A_n$ formed in the matrix former 125. The input coupling 205 couples at least a portion of matrix $A_n$ into a data aligner 210, which is operatively coupled via an optional correlation-reduction module 215 to a block former 220. In a preferred embodiment, matrix $A_n$ corresponds to a matrix comprising a symbol duration worth of elements, which corresponds to M chips per data channel per symbol. In general, fractional-chip sampling may be used so that the columns of the data matrix $A_n$ each contain an integer multiple, F, of M chips. The integer F may be unity, corresponding to chip-rate sampling. In a preferred embodiment, block former 220 assembles a data structure (e.g. a data matrix) which holds a plurality of symbol intervals worth of samples; for example, for $n=n_0 \ldots n_0+N-1$, where N=40. In one embodiment of the present invention, the data structure of block former 220 holds only one symbol duration worth of samples.

Block former 220 is operatively coupled to a block-output former 225 and a search-direction-calculation module 235. The output of block-output former 225 is coupled to several other modules, including a decision device 240 and a blind-error function module 245. The output of block-output former 225 may also be coupled to a first input coupling of an optional decision-directed error function module 250. The blind-error function module 245 is coupled to provide an error measure ($e_j$) to search-direction-calculation module 235. The search direction calculation module 235 is coupled to receive at least one set of parameters from a parameter-update module 255. The search direction-calculation module 235 is also coupled to provide a set of search direction information back to parameter-update module 255. Parameter-update calculation module 255 is coupled to provide at least one set of updated parameters to block-output former 225. Together, search direction-calculation module 235 and the parameter-update calculation module 255 constitute an example of an update-calculation module. Other adaptation algorithms which compute parameter updates using RLS and Gauss-Newton based approaches may be constructed similarly, and are within the scope of the present invention. The output of the decision device 240 is preferably coupled to an inverse mapping device 260. The output of the decision device 240 may also be coupled to a second input coupling of the optional decision-directed error calculation module 250. When present, the output of the optional decision-directed error calculation module 250 is coupled to the search-direction-calculation device 235.

In operation, communications receiver 100 performs adaptive signal processing to selectively demodulate a given user's spread spectrum signal. A plurality of sensors 105, typically antennas, simultaneously receive a radio frequency signal. As such, antennae 105 may be arranged into any array configuration; such as a linear, circular, or random. Because the antennae are located at different spatial coordinates, they collectively sample an RF electromagnetic wave propagating across the antenna array at different spatial points. The waveform received at each antenna is amplified and down-converted to base band in the receivers 110, optionally using one or more IF stages. More specifically, a signal received from a given antenna 105 is demodulated, preferably to provide a baseband signal. The baseband signal is then sampled either at the orthogonal code's chip rate or an integer multiple thereof in the A/D converter module 115. In one embodiment of the present invention, the receivers 110 down-convert the RF signals to baseband. Systems which incorporate, in an IF stage, some of the processing disclosed hereafter are within the scope of the present invention as well.

Each of the A/D converter modules 115 provides a digitized sample stream to a column-submatrix former 120. The column-submatrix former 120 then produces one or more column vectors of output. The number of output column vectors produced is preferably equal to F, a multiple of the chip rate at which the A/D module 115 samples the inner layer orthogonal code demodulated from antenna 105. For example, if the A/D module 115 samples at the chip rate, the column former 120 outputs one column vector whose samples are separated by the chip interval, $T_c$. If sampling is performed at F times the chip rate, then column former 120 may either produce one longer column vector comprising $$\frac{T_c}{F}$$

spaced samples, or F column vectors comprising $T_c$-spaced samples. When column former 120 provides multiple $T_c$-spaced columns, a submatrix is generated with $T_c$-spaced columns and $$\frac{T_c}{F}$$

spaced rows. As defined herein, a fractional-chip-sampled signal has samples which are spaced at $$\frac{T_c}{F},$$

where F is an F integer and F≧1. When $T_c$-spaced columns are used, the number of elements in the column vector preferably corresponds to the number of chips in a symbol, for example sixty-four. When quadrature symbol modulation is used, each column vector contains complex data samples generated according to the I and Q components provided at the output of the receiver 110. Each column-submatrix former 120 forms column vectors for an associated sensor (antenna) data path as illustrated in FIG. 1.

Column-submatrix formers 120 provide their column-vector submatrix outputs to matrix former 125. Matrix former 125 collects the column-submatrices provided thereto and develops a data matrix $A_n$ where the subscript "n" denotes a symbol-time index (e.g., 64 times the orthogonal code's chip duration) The matrix $A_n$ comprises the columns provided by the column-submatrix formers 120. In one embodiment, for example, there are M=64 chips per symbol and $$\frac{T_c}{F}$$

sampling so that each column-submatrix former 120 supplies an M×F submatrix comprising complex samples. In this embodiment, when F>1, there are a plurality of columns in each column-submatrix which are shifted with respect to a neighboring column by $$\frac{T_c}{F}.$$

To continue with this exemplary embodiment, there are in general L antennae, so that matrix former 125 assembles the column-submatrices into a matrix $A_n \epsilon C^{M \times FL}$. Matrix $A_n$ may be viewed as a space-chip matrix whose columns are tapped delay lines containing orthogonal code chip-samples. In an alternative embodiment, $$\frac{T_c}{F}$$

spaced samples are stored in each column, giving rise to a data matrix of the form $A_n \epsilon C^{ME \times L}$. In any of these embodiments, F=1 is a viable choice; and in a this special case, fractional-chip rate sampling corresponds to chip-rate sampling.

It should be noted that the matrix $A_n$ preferably involves all of the space-chip samples collected during the $n^{th}$ interval where there are M-chips per symbol. In general, embodiments may be developed which collect matrices over different durations and therefore have different sizes. Also, while matrix representations are convenient from the standpoint of mathematical analysis and clarity of discussion, any data structure which holds the collection of space-chip samples may be used. For example, at a component level, samples may be stored in any desired format in a plurality of memory cells. Thus, it is understood that a "data structure" is any organized collection of memory locations. Organization may be implicit in the accessing technique used by a software process to access the elements of the data structure. Further, the terms "matrix", "column", "row" and "submatrix" are used for purposes of mathematical clarity. In general, it is understood that any data structure may be used.

At least a portion of the matrix $A_n$ is coupled from former 125 to each of the user-channel processors 130. In one embodiment, the entire matrix is stored once and is made available to all of the user-channel processors 130. The user channel processors 130 may be implemented with custom logic, or may be implemented as software modules executing on a programmable signal processor chip. Similarly, user channel processors 130 may be implemented using a signal processor core. Any such implementation may time-share operations by executing operations required of more than one of the user-channel processors 130 on a single hardware structure. Some operations disclosed hereafter may be performed in custom hardware while others may be performed in digital signal processing software. All such variations may be made without departing from the spirit and scope of the present invention.

The output of each user-channel processor 130 is a recovered information stream. The recovered information stream is an estimate of an information stream sent by a transmitter to the communication receiver 100. The outputs of the user-channel processors 130 are routed to a network interface 135. Network interface 135 may comprise telephony switching equipment to selectively couple the reconstructed data streams to a circuit switched telephone network. Further, network interface 135 may comprise an access concentrator which packetizes data and couples it to a packet network such as an ATM network, a wireless LAN, or the Internet.

Referring once again to FIG. 2, operation of the user-channel processor 130 is described in further detail. The matrix $A_n$ is presented to the input of the data aligner 210. The data aligner 210 preferably includes a correlation device and performs a course symbol-timing recovery. More specifically, data aligner 210 correlates a portion of the data matrix $A_n$ so as to determine a time-window which encompasses preferably one symbol worth of chip-samples for the $k^{th}$ user. In some embodiments data aligner 210 performs a separate correlation for each column-submatrix corresponding to a separate antenna. The data aligner 210 provides an aligned matrix, $\check{A}_n$, whose columns are at least coarsely symbol-aligned so as to be aligned with the chip-domain vector space's orthogonal code vectors. Data aligner 210 may perform its function implicitly, by simply providing one or more pointers indicative of an appropriate symbol boundary within one or more chipped data streams.

The output of data aligner 210 is operatively coupled to the optional correlation-reduction module 215. The correlation-reduction module 215 forms a data reducing operation $C^H \check{A}_n$, where $C^H$ is a matrix whose rows are a set of delayed versions of the inner-layer orthogonal spreading code of the $k^{th}$ user. While in general C may have complex elements, normally the matrix C has real elements whose values are restricted to ±1. Normally $C^H = C^T$, and the matrix multiplication $C^H \check{A}_n$ involves only additions and subtractions, and so may be efficiently computed in specialized hardware. In embodiments which use a correlation-reduction module 215, the output of module 215 is given by $\Gamma_n = C^H \check{A}_n \in C^{P \times FL}$. Preferably, P<M, so that the resulting matrix $\Gamma_n$ has fewer elements than $\check{A}_n \in C^{M \times FL}$. Recall F is the fractional-chip rate integer multiplier (F≧1) and L is the number of antennae in the system. It should be understood that the correlation-reduction module 215 is optional, and provides a cost saving means to reduce chip-domain column vectors to compressed correlation-domain column vectors. As in RAKE oriented receivers, the rows of $C^H$ may be selected to coincide with a set of correlation peaks, or may be evenly spaced over a certain range of delays. Because the spreading code is typically periodic, the rows of $C^H$ are preferably circularly shifted versions of one another. Some embodiments do not use a correlation-reduction module 215. In such embodiments, the output of the (non-existent) correlation-reduction module 215 is given by $\Gamma_n = \check{A}_n \in C^{M \times FL}$. Thus in all embodiments, a sequence of matrices $\{\Gamma_n\}$ is operatively coupled to the input of the block former 220.

Block former 220 is operative to form a data block which comprises one or more of the matrices $\{\Gamma_n\}$. For example, block former 220 assembles a block comprising a set of matrices $D_i = \{\Gamma_n | = n_0 \ldots n_0+N-1\}$ where N is the number of symbols worth of samples in a block, $D_i$ is the $i^{th}$ data block, i is a block-time index, and n is a symbol index. In the limit, N=1, and this leads to a specific type of embodiment where i=n. More generally, at the block boundaries $n_0 = iN$. The actual value of N used in a given embodiment is dependent on system parameters such as M, L and F; and in an illustrative example configuration previously presented, a value of N=40 was used. Primarily, systems using N>l are preferred.

Block former 220 includes a first output operatively coupled to the block-output former 225. The block output former 225 computes a vector of outputs for the block, $D_i$, which is denoted as $\vec{y}_i^{(j)}$. Each element of $\vec{y}_i^{(j)}$ is preferably a bilinear combination of the constituent input matrices of the $i^{th}$ data block, $D_i$. More specifically, $\vec{y}_i^{(j)} = \{y_n | y_n = w^{(j)H} \Gamma_n x_i^{(j)}, n = n_0 \ldots n_0+N-1\} \in C^N$. In this definition, the subscript i is the block index and the superscript j is an adaptation-iteration index described hereafter. In general, other parametric combinations may be used. As defined herein, a "parametric combination" is any-function which combines data sample values with parameter values to produce an output. An example of a linear parametric combination is the output of a transversal FIR filter. An example of a nonlinear parametric combination is the output of a layered neural network.

The block output former 225 uses two sets of input parameters in order to compute the vector of block outputs, $\vec{y}_i^{(j)}$. A first set of input parameters is called the chip-domain set of parameters and is denoted as $w_i^{(j)}$. The chip-domain set of parameters is in general a complex vector. In embodiments where the correlation-reduction module 215 is employed, $w_i^{(j)} \in C^P$. In such embodiments, the chip-domain parameter vector $w_i^{(j)}$ actually weights a set of correlation values which have already been processed by the matrix $C^H$. In embodiments where the correlation-reduction module 215 is not employed, $w_i^{(j)} \in C^M$. The subscript i of the parameter vector $w_i^{(j)}$ indicates the $i^{th}$ data block while the superscript j indicates an adaptation-iteration index. A second set of similarly indexed parameters is called the spatial-domain set of parameters and is denoted $x_i^{(j)} \in C^{FL}$. Recall that F≧1, and in some embodiments the columns of $\check{A}_n$ may alternatively have FM elements, in which case $w_i^{(j)} \in C^M$ and the dimensions of $w_i^{(j)}$ or $C^H$ are scaled accordingly.

The chip-domain parameters form an inner product with each of the column vectors of each of the matrices $D_i = \{\Gamma_n | n = n_0 \ldots n_0+N-1\}$, while the spatial-domain parameters form an inner product with each row of these same matrices. The column vectors of the matrices $\{\Gamma_n\}$ are in the vector space of the chip domain while the rows of the matrices $\{\Gamma_n\}$ are in the vector space of the spatial domain. When the correlation-reduction module 215 is employed, column vectors of the matrices $\{\Gamma_n\}$ are in the vector space of a P-dimensional correlation domain. Because the filter output vector $\vec{y}_i^{(j)}$ is linear in both sets of parameters $\vec{w}_i^{(j)}$ and $\vec{x}_i^{(j)}$, the adaptive signal processor generating this output is termed a "bilinear filter" structure.

The present invention provides an adaptation mechanism which jointly optimizes, on a block-by-block basis, the chip-domain parameters $\vec{w}_i^{(j)}$ and the spatial-domain parameters $\vec{x}_i^{(j)}$. The adaptation mechanism uses an iterative process, preferably according to a block-adaptive non-linear optimization algorithm. In general, the space-chip parameters are updated to reduce a measure associated with an error function, as disclosed hereafter.

In one embodiment, at an initial block-time i=0, first block $D_o$ is formed in block former 220. At this time, the chip-domain parameters $\vec{w}_i^{(j)}$ and the spatial-domain parameters $\vec{x}_i^{(j)}$ are respectively set to an initial state corresponding to $\vec{w}_0^{(0)}$ and $\vec{x}_0^{(0)}$. In these expressions, the block index i is set to i=0 and the adaptation-iteration index j is set to j=0. In general, after each new block $D_i$ is formed, the iteration index is reset to zero. The j-index is controlled according to a desired form of inner-loop indexing. For use at time (i,j)=(0,0), parameter vectors $w_0^{(0)}$ and $x_0^{(0)}$ must be set to some initial values. According to the present invention, the parameter vector $w_0^{(0)}$ is set based upon the user's spreading code. For example, if the columns of the $\{\Gamma_n\}$ matrices have chip-spaced samples, then the parameters $w_0^{(0)}$ are preferably set to the user's inner-layer orthogonal spreading code. If F>1, and the columns of the $\{\Gamma_n\}$ matrices have $$\frac{T_c}{F}$$

spaced samples, then the parameters $w_0^{(0)}$ are preferably set to the user's spreading code with each chip repeated F times. The parameters $x_0^{(0)}$ may be set based on any a priori spatial information which is available concerning direction to the user. If no a priori spatial information is known, the spatial parameter vector $x_0^{(0)}$ may be initialized to a desired set of starting values. In general, no a priori information concerning a user's spatial location is needed at start-up. In some embodiments, coarse or fine resolution a priori spatial information may be available, based on information provided by a sectorized control channel, cooperative co-channel triangularization among base stations, or a mobile reporting its own GPS location information.

Given the initial parameters, $w_0^{(0)}, x_0^{(0)}$, block former 220 next computes an output vector according to $\vec{y}_0^{(0)} = \{y_n | y_n = w_0^{(0)H} \Gamma_n x_0^{(0)}, n = n_0 \ldots n_0 + N - 1\} \in C^N$. That vector of block-outputs transfers to blind-error function module 245. In one embodiment, blind-error function module 245 computes an error function, $$f_1(w, x) = \frac{1}{4N} \sum_{n+n_o}^{n_n+N-1} \left| [(w^H \Gamma_n x)^2 - r] \right|^2 \in R \quad (1)$$

where r is an arbitrary radius constant (r=1 is a common choice) and R is the set of real numbers. The function $f_1(w,x)$ is computed using appropriate sets of parameters based on the current block and adaptation-iteration indices. More specifically, the function $f_1(w,x)$ is computed in a loop-control ordering according to $f_1(w_i^{(j)}, x_i^{(j)})$. In a first iteration, at time (i,j)=(0,0), the function $f_1(w,x)$ is computed as $f_1(w_0^{(0)}, x_0^{(0)})$. The blind-error function is useful because it computes an error without knowledge of the correct value of the user's symbol. The blind-error function does not rely on an estimate of the user's symbol. In the embodiment described above, and illustrated by equation (1), the blind error function is a type of modulus-restoration function. As such, if the user's symbols are modulated with QPSK, and signal points in the transmitted-signal constellation comprise the points {(1,1), (1,-1), (-1,1), (-1,-1)}, the value r is preferably set to r=√2. Thus, the blind-error function measures the deviation between the block-output vector $\vec{y}_i^{(j)}$ and a vector whose elements, $y_n$, lie on the radius r=√2 circle in the complex plane. Other blind-error functions (e.g., based on higher order statistics) may be converted to a block form similar to the error function of equation (1). All such embodiments are within the scope of the present invention.

Blind-error function module 245 provides a measure to be used to direct the updating of the parameters $w_i^{(j)}$ and $x_i^{(j)}$. To this end, the error value $f_1(w_i^{(j)}, x_i^{(j)})$ is transferred to the search direction calculation module 235. Search direction calculation module 235 determines an update quantity, to be combined with current sets of parameters, to develop new sets of parameters which generally give rise to a lower value of the blind-error function. More specifically, search direction calculation unit 235 jointly determines a pair of search directions $(dw_i^{(j)}, dx_i^{(j)})$ and a pair of step sizes $(\mu_i^{(j)}, Y_i^{(j)})$ such that the parameters may be updated according to:

$$w_i^{(j+1)} = w_i^{(j)} + \mu_i^{(j)} dw_i^{(j)} \quad (2)$$

and $$x_i^{(j+1)} = x_i^{(j)} + y_i^{(j)} dx_i^{(j)} \quad (3)$$

where the search directions and step sizes are preferably computed so that, at least on average, $f_1(w_i^{(j+i)}, x_i^{(j+i)}) < f_1(w_i^{(j)}, x_i^{(j)})$. Equations (2) and (3) above constitute one embodiment of a tap-weight update calculation performed in parameter update module 255.

In one embodiment, the search directions and step sizes are computed using a nonlinear optimization algorithm to minimize a nonlinear error function, such as the one given in equation (1). When a nonlinear optimization algorithm is applied to blocks and matrices indexed according to the (n,i,j)-indices as described above, the approach becomes a block-adaptive nonlinear optimization scheme which can track rapidly time varying channel parameters. When configured as herein disclosed, the nonlinear optimization algorithm serves to orthogonalize the user's signal from other user's signals (MAI) jointly in both the chip and spatial domains. Similarly, when configured as herein disclosed, the nonlinear optimization algorithm serves to minimize effects of thermal channel noise and selects parameter search directions to cause multipath components of the user's signal stream to optimally combine so as to minimize the blind-error function. CDMA systems use vocoders which already introduce a block delay into the communication link, and the block processing of the present invention may be conveniently pipelined into such a configuration.

There are many algorithms which may be adapted for block lo processing to compute the search directions and the step sizes in calculation module 235, including: block steepest descent (gradient descent), block conjugate gradient, block-Shanno, Gauss-Newton, block-Marquardt, or other nonlinear optimization approaches. For illustrative purposes, one embodiment in which the nonlinear optimization algorithm is a block-adaptive Shanno algorithm is presented hereafter.

In a block-adaptive Shanno algorithm, a search direction is formed as a linear combination of a gradient, a gradient-difference, and a previous search direction. A block-adaptive steepest descent algorithm (gradient descent) and a block-adaptive conjugate gradient algorithms are special cases of a Shanno algorithm. In many adaptive approaches a gradient vector of the parameters, with respect to the error function, is needed. For example, using vector calculus and applying the chain rule of derivatives, gradients of $f_1(w,x)$ with respect to the chip-domain parameters and the spatial-domain parameters are respectively given by:

$$gw \equiv \frac{\partial f_1(w, x)}{\partial w} = \frac{1}{N} \sum_{n=n_o}^{n_o+N-1} \left[ (w^H \Gamma_n x)^2 - r \right] (w^H \Gamma_n x) \Gamma_n^* x, \quad (4)$$

and $$gx \equiv \frac{\partial f_1(w, x)}{\partial x} = \frac{1}{N} \sum_{n=n_o}^{n_o+N-1} \left[ (w^H \Gamma_n x)^2 - r \right] (w^H \Gamma_n x) \Gamma_n^* w, \quad (5)$$

An augmented gradient vector may also constructed according to:

$$g \equiv \begin{bmatrix} gw \\ gx \end{bmatrix} \quad (6)$$

In accordance with the present invention, with gradients defined as in equations (4)–(6), the block-adaptive Shanno algorithm may be applied in several ways.

A first way to apply a block- adaptive nonlinear optimization algorithm, such as the block-adaptive Shanno algorithm, is to use equations (4) and (5) to derive separate gradients and run two Shanno algorithms in parallel. More specifically, for the $i^{th}$ data block, $D_i$, compute a set of gradients evaluated at $w_i^{(j)}$ and $x_i^{(j)}$. Next, independently perform the updates according to equations (2) and (3) to arrive at updated parameters $w_i^{(j+1)}$ and $x_i^{(j+1)}$. Another embodiment uses an interleaved approach. For example, evaluate the gradient of equation (4) at $w_i^{(j)}$ and $x_i^{(j)}$. Next, compute an update according to equation (2) to arrive at $w_i^{(j)}$. Next, compute the gradient of equation (5) evaluated at $w_i^{(j+1)}$ and $x_i^{(j)}$, and then compute an update according to equation (3) to arrive at $x_i^{(j+1)}$.

Another embodiment applies a single application of the block Shanno algorithm to an augmented parameter vector. A general form of an augmented update equation is:

$$\begin{bmatrix} w_i^{(j+1)} \\ x_i^{(j+1)} \end{bmatrix} = \begin{bmatrix} w_i^{(j)} \\ x_i^{(j)} \end{bmatrix} + [(\mu_i^{(j)}, \Upsilon_i^{(j)})] \begin{bmatrix} dw_i^{(j)} \\ dx_i^{(j)} \end{bmatrix}. \quad (7)$$

To apply a single block-adaptive Shanno algorithm, a constraint, $\mu_i^{(j)}$, $\Upsilon_i^{(j)}$ is added to equation (7). In this case, only a single step size is computed and the augmented gradient vector of equation (6) may be fed to a single algorithm configured to jointly orthogonalize a user's signal in both the chip and spatial domains. All three of these embodiments jointly orthogonalize a user's signal in both the chip and spatial domains.

At this point consider once again the, initialization of the algorithm. The $w_0^{(0)}$ and $w_0^{(0)}$ vectors are initialized as discussed above. Then the error function $f_1(w,x)$ is evaluated at $f_1(w_{0(0)}, x_0^{(0)})$, and the gradient functions are evaluated at $w_0^{(0)}$ and $x_0^{(0)}$. Next, a search direction is computed using a nonlinear optimization algorithm of choice such as a Shanno algorithm. Then the parameter vectors are updated according to equations (2) and (3) above. This corresponds to an iteration in the index j, and yields $w_0^{(1)}$, and $x_0^{(1)}$. If little or no a priori information relating to the spatial location of the $k^{th}$ user is available, the vector $w_0^{(0)}$, is preferably held constant while the vector $x_0^{(j)}$ is updated. Such a method may be applied for the first several data blocks in some embodiments. Next, the updated parameters are sent from the parameter-update module 255 back to the block-output former 225. The block-output former 225 then computes an output vector $\vec{y}_0^{(1)}$. This output is fed back to the blind-error function module 245 and the gradients of equation (4) and (5) are computed at the updated parameter values $w_0^{(1)}$ and $x_0^{(1)}$. The gradient information is used along with previous gradient and search direction information to compute a new search direction and step sizes using any of the foregoing approaches or variations thereof.

Thus, a smart-antenna based multiuser detector of the present invention involves a block-adaptive process which performs a set of iterations for each assembled block of data. In one embodiment, a maximum number such as four iterations in the index j are computed for each data block $D_i$. Also, a block-convergence end condition is preferably used. For example, if the norm of the gradient vector $\|g_i^{(j)}\|$ is below a threshold, the iterations for the block $D_i$ are terminated early. Similarly, stopping conditions may be used to control the inner looping of the non-augmented parameter sets $w_i^{(j)}$ and $x_i^{(j)}$, individually. Upon the last iteration, output vector $\vec{y}_i^{(j_f)}$ is coupled as output to the decision device 240. Here $j_f$ denotes the final j-index value of the inner loop for the $i^{th}$ data block. The decision device 240 then uses either symbol-by symbol slicing or an MLSE sequence estimator to recover the user's transmitted symbol stream. The recovered symbol stream is then coupled to an inverse mapping unit which in turn regenerates the transmitted bit stream of the $k^{th}$ user.

Thus an embodiment of the system 100 generally involves a multiuser detector, which includes a processor for executing a block-adaptive nonlinear optimization algorithm, configured to jointly optimize a set of spatial-domain parameters and a set of chip-domain parameters. These parameters are used in a bilinear-orthogonalizing filter structure which applies the set of parameters to a matrix whose elements comprise fractional-chip or correlation-domain samples of a composite CDMA signal. The composite CDMA signal includes signal components due to a plurality of users and different samples are derived from a plurality of antennas or sensors. The multiuser detector produces a vector of decision statistics which are sent to a decision device to recover a symbol stream transmitted by a user. The multiuser detector may be implemented using dedicated circuits, as a set of software modules, or a combination thereof.

Figure 3:
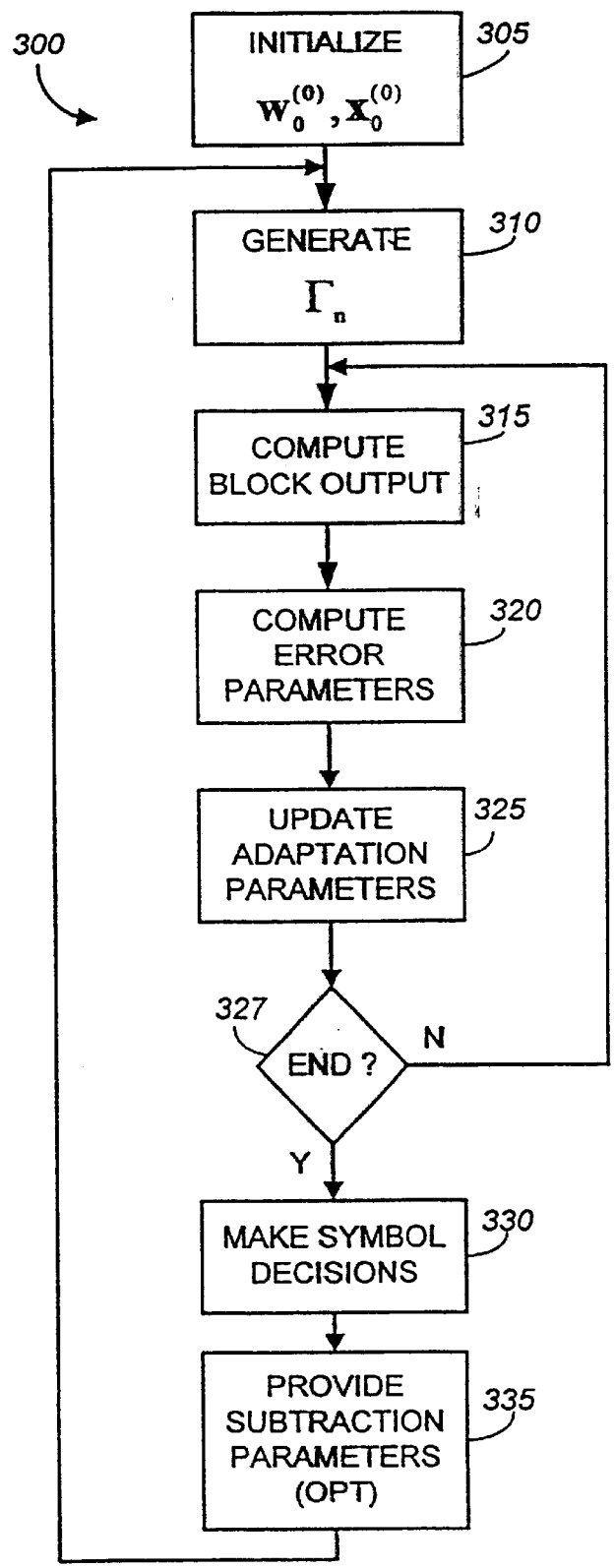
FIG. 3 is a flow chart illustrating a system of digital signal processing with a user-channel processor of the present invention.

To further understand the system illustrated by FIG. 2, a processing system 300 is illustrated in block diagram form in FIG. 3. Process 300 depicts: a mode of operating the multiuser detector 100 and the user channel processor 130. In a first step 305, a set of chip-domain parameters and a set of spatial-domain parameters are respectively initialized to $w_0^{(0)}$ and $x_0^{(0)}$ using any of the techniques disclosed herein. In a second step 310, a data block $D_i$ is collected. The second step 310 is the first of a series of steps of an outer loop of control indexed by the block index, i. Second step 310 involves buffering the input data from each antenna into a column-submatrix (120), forming a data structure comprising the column-submatrices (125) and aligning the data contained in the columns according to a symbol boundary (210). In some embodiments, this is preferably performed with the assistance of an outer-layer code locked loop or similar PN sequence detector/correlator involved in an outer layer of de-spreading. In some embodiments step 310 also involves performing the outer layer de-spreading itself. Step 310 also involves an optional sub-step (215) of applying the correlation-domain reduction matrix $C^H$ to reduce the input data as previously described. By the end of second step 310, the data block $D_i = \{\Gamma_n | n = n_0 \ldots n_0 + N - 1\}$ is available for processing.

Control next passes to a third step 315 where a block of outputs, $\vec{y}_i^{(j)}$ is computed (225). Third step 315 is the first of a series of steps inside an inner loop of control indexed by the iteration index, j. At this point the block index is set to i. After second step 310, the iteration index, j is reset to zero. Hence, during the $i^{th}$ block time, the first time through the inner loop, the iteration index is set to zero and $\vec{y}_i^{(0)}$ is produced. Control next passes to a fourth step 320 where the error function $f_1(w,x)$ is evaluated at $f_1(w_i^{(j)}, x_i^{(j)})$ and similarly the gradient of the error function, g is evaluated at $w_i^{(j)}$ and $x_i^{(j)}$. Control next passes to a fifth step 325 where the adapt ion parameters are updated (235, 255). The adaptation parameters include the $w_i^{(j)}$ and $x_i^{(j)}$. Depending on the block-adaptive algorithm used, the adaptation parameters also include the search directions, step sizes, and/or a gradient-difference vector, as given, for example, by $\mu_i^{(j)} = g_i^{(j-1)} - g_i^{(j-2)}$. At the end of fifth step 325, updated adaptation quantities are available. For example, the updated set of chip-domain parameters $w_j^{(i+1)}$ and the updated set of spatial-domain parameters $x_j^{(i-1)}$ are available for a next pass through the inner loop. Control passes out of fifth step 325 based upon a decision 327. Decision 327 is an inner-loop stopping condition. Preferably, a check is made to see whether a fixed maximum number of inner-loop iterations has been performed or a measure of the gradient, g, is sufficiently small. If neither of these conditions are met, control passes back to third step 315, which is the entry point of the inner loop. Control runs ago through the inner loop (steps 315–325) until the end condition 327 is affirmative.

When end condition 327 is affirmative, control next passes to a sixth step 330. In sixth step 330, a set of symbol decisions are made (240), for example by slicing or via MLSE sequence estimation. The symbol decisions are used to recover an estimate of the transmitted bit stream (260). Control next passes to a seventh step 335. In seventh step 335, a set of subtraction parameters is optionally coupled back to the matrix former 125. The subtraction parameters and their use are hereafter disclosed in relation to FIG. 5.

Whether or not the subtraction parameters are used, the outer-loop block index, i, is incremented and control passes out of seventh step 335 back to the outer-loop entry point in second step 310.

In actual real-time embodiments, the block index i need not be explicitly maintained, and step 335 may involve awaiting an interrupt or a software flag, which indicates a new block of data has been assembled in the matrix former 125. Typically, control continues to run through the outer loop until the system is turned off or the user disconnects, depending on the specific embodiment.

Figure 4:
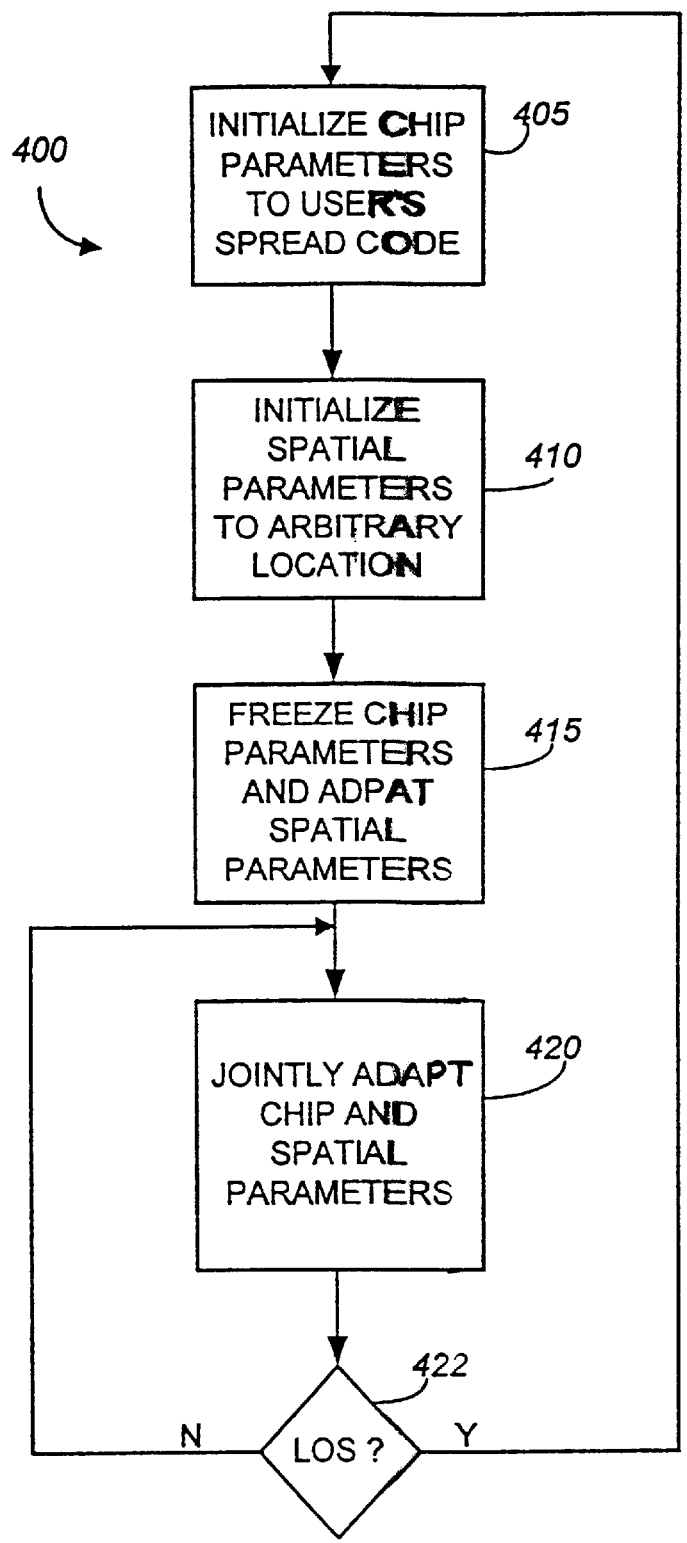
FIG. 4 is a flow chart illustrating a system of initialization with space-chip processing systems of the present invention.

Referring now to FIG. 4, a system 400 for initializing the set of chip-domain parameters and the set of spatial-domain parameters is illustrated in flow chart form. In a first step 405 a set of chip-domain parameters is initialized substantially to the spreading code of a user. As disclosed previously, this typically involves an inner-layer orthogonal code, such as a Walsh code, which remains constant from symbol to symbol. Control next passes to a second step 410 where the set of spatial-domain parameters is initialized. These may be initialized to any desired and arbitrary values. If a priori knowledge about the user's location is known, for example based upon GPS information sent by a mobile via a control-channel, then these parameters are preferably initialized to form a main lobe in the direction of the user.

Control next passes to a third step 415. In third step 415, one or more iterations of the outer loop (310–340) of system 300 are performed with the chip-domain parameters held constant. This forces the spatial-domain parameters to adapt to a nominal value close to their optimal values for a given user; This step may be repeated for one or more data blocks. Control passes to a fourth step 420, which preferably also involves the outer loop (310–340) of system 300. In step 420, the outer loop of system 300 proceeds while adapting both the chip-domain and the spatial-domain parameters concurrently. This allows the sets of chip-domain parameters and spatial domain parameters to converge jointly to an estimate of their optimum values and to track their optimum values from block to block. Any of the aforementioned three joint adaptation policies (parallel, interleaved, and augmented) or variations thereof may be applied in this step.

Control passes out of fourth step 420 based upon a first decision 422. If a loss of signal (LOS) condition is determined, control passes back to first step 405. The LOS condition may be triggered, for example, when an outer-layer code-locked loop losses acquisition or the user disconnects from the channel. Some information regarding the spatial parameters may be maintained and used as a priori information while reinitializing when control loops back through step 405 to step 410 for cases where the signal has temporarily dropped out. If the LOS condition is negative, control resets back to fourth step 420, indicative of another pass through the outer loop 310–340 of system 300.

Figure 5:
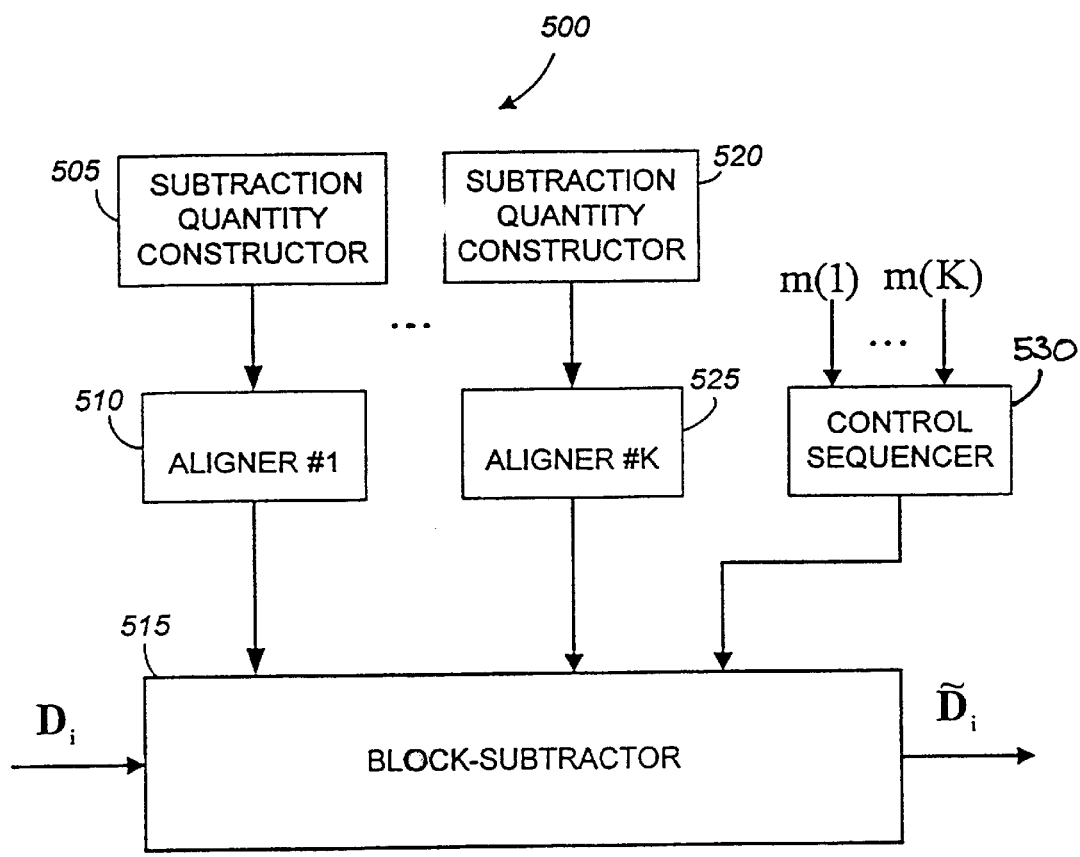
FIG. 5 is a block diagram illustrating a system for subtractive CDMA multi-user detection according to the present invention.

FIG. 5 illustrates a system 500 for subtractive CDMA multi-user detection according to the present invention. A first user processor 130 sends its output parameters $w_j^{(i)}$ and $x_j^{(i)}$ and the final vector of decisions $\vec{y}_j^{(ji)}$ during step 340 of system 300. These parameters and decisions represent the converged values for the $k^{th}$ user during the $i^{th}$ block interval; and sent to a subtraction quantity former 505. Subtraction quantity former 505 combines the $w_i^{(j)}$ and $x_i^{(j)}$ along with vector of decisions $\vec{y}_i^{(ji)}$ to form a-subtraction quantity. In one embodiment, the subtraction quantity is a block-outer product matrix of the form:

$$S_i = \begin{bmatrix} d_{n_0} w_{i(jf)} x_{i(jf)H} \\ \vdots \\ d_{k_0+P} w_i^{(jf)} x_i^{(jf)H} \end{bmatrix} \in C^{NM \times FL} \quad (8)$$

where $j_f$ again denotes the final value of the iteration index for the $i^{th}$ data block, $D_i$. If a correlation reduction module 215 is used, then $S_i \in C^{NP \times FL}$. For the case where the columns of $\Gamma_n$ are length FM, fractionally-chip sampled vectors, $S_i \in C^{NMF \times L}$. Other combinations of the converged parameters $w_i^{(j)}$ and $x_i^{(ji)}$ and the decision vector $\vec{y}_i^{(ji)}$ may alternatively be used. Also, in some embodiments, the formation of a subtraction product is implicit and is formed during a subtraction process as hereafter disclosed.

An output of the subtraction quantity former 505 is operatively coupled to a first subtraction aligner 510. The first subtraction aligner 510 aligns, either explicitly or implicitly, the subtraction quantity with the original composite CDMA data streams. The subtraction aligner 510 performs substantially the inverse operation of data aligner 210, to align the subtraction-quantity formed in subtraction quantity former 505 with the input composite set of data streams to user processor 130. Lag related data provided from data aligner 210 is preferably coupled to and reused by the subtraction aligner 510.

The output of subtraction aligner 510 is coupled to a block subtraction unit 515. The subtraction unit 515 subtracts a subtraction quantity, such as the one given by equation (8), from the collection of composite data matrices $\{\check{A}_n\}$ or $\{\Gamma_n\}$ during the $i^{th}$ block interval. The subtraction quantity may be constructed implicitly and on-the-fly in the subtraction unit 515, using multiply-subtract operations and appropriate indexing. Such implicit matrix manipulations should be known to those skilled in the art of numerical programming. Hence, the actual subtraction may be carried out in a number of substantially equivalent ways A second, substantially identical, subtraction data path comprising subtraction quantity former 520, subtraction aligner 525, and subtraction unit 515 is shown for a second user. In general, each user whose signal is to be subtracted from the composite signal may be subtracted similarly to the $k^{th}$ user's subtraction quantity as disclosed above. Subtraction unit 500 allows strong signal sources, due to near-in users, to be isolated via the joint chip/spatial-domain adaptive bilinear orthogonalization process, and to then have these isolated signal components subtracted from a composite CDMA waveform. After space-chip orthogonalization, the strong components will be largely separated from the weaker users.

A subtraction control sequencer 530 is operatively coupled to control operation of subtraction unit 500. Subtraction controller 530 is provided with measures of user's signal powers, energies, or related normed quantities; denoted as m(1) . . . m(K), and corresponding to users k=1, . . . K. In one embodiment, users with strong signals are decoded first and the subtraction quantities of the strong users are subtracted prior to detection of weaker signals. For example, a set of thresholds may be maintained, to be used to determine whether subtraction is needed. If the powers of a first set of users are very low with respect to a second set of users, then the second set of users' signals are decoded and their subtraction quantities subtracted prior to decoding the first group of users' signals. Various embodiments, to include one where each user is rank-ordered according to power and whereby subtraction of each user's subtraction quantity is performed sequentially are all within the scope of the present invention.

Subtraction according to system. 500 provides a way to achieve near-far interference resistance, without having the subtractions of the strong users significantly reduce the signal energy of weaker signals. This is because the stronger signal components are subtracted based upon an improved set of orthogonalized parameters. The system 500 may be used with single antenna systems. In such embodiments, the spatial-domain parameter vector, $x_j^{(i)}$ may be set to an arbitrary gain constant such as one. The subtractive CDMA method and apparatus of the present invention uses optimally orthogonalized bilinear filter parameters. These parameters may involve adaptive parameters drawn from only the chip domain, or both the chip and spatial domain.

Additionally, the present invention provides a variety of business structures. For example, a method of providing telecommunication services involves the step of supplying CDMA wireless connectivity to a plurality of users. The users all transmit spread spectrum encoded users signals, which are received by a smart antenna array in a base station using a smart antenna array. Data streams associated with individual user signals are extracted from the composite CDMA waveform and are coupled to a communication interface 135; providing users with packet switched or circuit switched service. A service provider may then collect revenue from each user based upon a flat rate or a usage-oriented rate. Similarly, wireless LAN services and other forms of local connectivity which provide services to customers can be provided.

A variety of embodiments and adaptions of the present invention should be apparent to those skilled in the art. For example, it is well known that matrices can be transposed, so that all disclosure pertaining to columns of a matrix may apply to the rows of a transposed matrix. Likewise the rows of a matrix, once transposed correspond to columns. All such variations are comprehended by the present invention. Embodiments which transpose certain matrices and define matrix-vector operations as transposed operations are also comprehended. In addition, while W-CDMA compliant modulation parameters have been used for illustration purposes, the present invention is applicable and readily adapted to related systems such as indoor CDMA wireless LANs and indoor PCS systems. In the systems described herein, pipelining may be applied so that certain steps in may be reordered or overlapped with other steps. Similarly, the given index values are illustrative and other values may be used. For example, a loop may start at j=1 instead of j=0. While the disclosed embodiments are directed to a wireless base station performing multiuser detection, the present invention may also be used in a mobile unit supplied with a smart antenna-array to extract one or more forward channel data streams.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

We claim:

1. An adaptive signal processor in a CDMA smart antenna system comprising:
    a first forming element, adapted to assemble a plurality of data samples received into a data structure;
    a set of chip-domain parameters;
    a set of spatial-domain parameters;
    a second forming element, coupled to said first forming element, adapted to receive at least a portion of said data structure and said sets of parameters, and adapted to produce an output which is a parametric combination of said sets of parameters and said data structure;
    an error-function element, coupled to said second forming element, and adapted to render a value based on a desired error function;
    a calculation element coupled to said error-function element and said first and second forming elements, adapted to receive said value and said sets of parameters, and to modify said sets of parameters responsive to said value;
    a decision element, coupled to said second forming element, and adapted to recover a desired symbol stream from said plurality of data samples; and
    an inverse mapping element coupled to said decision element and adapted to map said desired symbol stream into a recovered information bit stream.

2. The adaptive signal processor according to claim 1, wherein said desired error function is a decision-directed error function.

3. The adaptive signal processor according to claim 1, wherein said parametric combination is a bilinear combination.

4. A system extracting a desired information stream from a composite CDMA waveform, said system comprising:
    a sensor element;
    a receiving element coupled to said sensor element;
    an analog to digital converter element coupled to said receiving element;
    a data structure forming element coupled to said analog to digital converter element;
    a processor element coupled to said data structure forming element; and
    a network interface element coupled to said processor element,
    wherein said processor element further comprises:
        a first forming element, adapted to assemble a plurality of data samples received into a data structure;
        a set of parameters;
        a second forming element, coupled to said first forming element, adapted to receive at least a portion of said data structure and said set of parameters, and adapted to produce an output which is a parametric combination of said set of parameters and said data structure;
        an error-function element, coupled to said second forming element, and adapted to render a value based on a desired error function; and
        a calculation element coupled to said error-function element and said first and second forming elements, adapted to receive said value and said set of parameters, and to modify said set of parameters responsive to said value;
        a decision element coupled to said second forming element and adapted to recover a desired symbol stream from said plurality of data samples; and
        an inverse mapping element coupled to said decision element and adapted to map said desired symbol stream into a recovered information bit stream.

5. The system of claim 4 wherein said network interface element further comprises a telephone switching apparatus coupled to a circuit switched telephone network.

6. The system of claim 4 wherein said network interface element further comprises an access concentrator coupled to a packet switched network.

7. The system of claim 4 wherein said data structure forming element further comprises a matrix former adapted to form a plurality of received spread-spectrum encoded samples into a data matrix comprising a symbol duration worth of samples.

8. The system of claim 7 wherein said data matrix further comprises a plurality of columns, each of said columns comprising samples spaced by at least a chip interval.

9. The system of claim 8, wherein said data matrix further comprises a plurality of rows, each of said rows comprising samples spaced according to a spatial sampling pattern.

10. The system of claim 8, wherein said data matrix further comprises a plurality of rows, each of said row comprising samples spaced according to a fractional chip interval.

11. The system of claim 4, wherein said analog to digital converter element is adapted to convert a demodulated signal to a digital signal with samples spaced in time by a fractional-chip interval.

12. The system of claim 11, wherein said receiving element is adapted to convert a propagation signal received from said sensor element into said demodulated signal.

13. The system of claim 4, wherein said sensor element is an antenna adapted to receive a set of propagating electromagnetic waves impinging thereon.

14. A method for extracting an information stream, associated with a user, from a space-chip sampled composite CDMA waveform, comprising the steps of:
   providing a plurality of sensors adapted to receive communication signals from a plurality of users, where each of said users has an associated spreading code;
   forming a data structure having a plurality of data elements comprising chip domain and spatial domain data vectors, where at least two of said data elements within said data structure are drawn from distinct sensors;
   initializing a set of chip domain parameters to be substantially equal to a spreading code associated with said user;
   block-adaptively updating a set of spatial domain parameters and said set of chip domain parameters to jointly reduce a desired error function;
   forming a parametric combination of said chip domain data vectors, said spatial domain data vectors, said chip domain parameters and said spatial domain parameters to generate a decision statistic; and
   estimating an information symbol transmitted by said user responsive to said decision statistic.

15. The method of claim 14, wherein the step of block-adaptively updating comprises use of a block-adaptive nonlinear optimization algorithm.

16. The method of claim 14, wherein the step of block-adaptively updating comprises use of a block-adaptive Shanno algorithm.

17. The method of claim 14, wherein the step of block-adaptively updating comprises use of a block-adaptive conjugate gradient algorithm.

18. The method of claim 14, wherein the step of block-adaptively updating comprises use of a block size of one.

19. A bilinear adaptive filter system comprising:
   a matrix forming element, adapted to form a data matrix having a plurality of rows and columns;
   a first set of filter parameters;
   a second set of filter parameters;
   a bilinear matrix-product output element adapted to receive said data matrix, and to output a weighted linear combination having the columns of said matrix weighted by said first set of parameters and the rows of said matrix weighted by said second set of parameters;
   an error function element adapted to estimate first and second gradients of an error function by said first and second sets of parameters, respectively; and
   an adaptive-update element adapted to receive and apply said first and second gradients within a block-adaptive nonlinear optimization algorithm to jointly update said first and second sets of filter parameters and reduce a measure associated with said error function.

20. The bilinear adaptive filter system of claim 19 wherein said second set of filter parameters is initialized to a user spreading code a CDMA communication system.

21. The bilinear adaptive filter system of claim 20 wherein said error function is a blind error function.

22. The bilinear adaptive filter system of claim 21 wherein said blind error function is a modulus restoration error function.

23. The bilinear adaptive filter system of claim 21 wherein, responsive to said first and second gradients, said adaptive-update element derives a search direction according to a nonlinear optimization algorithm.

24. A method for extracting an information stream from a CDMA waveform having a plurality of overlapping coded signals, said method comprising the steps of:
   forming a data block comprising a plurality of space-chip samples of said CDMA waveform;
   passing at least a portion of said data block into a space-chip orthogonalizing filter jointly optimizing a set of spatial domain parameters and a set of chip-domain parameters to reduce an error function responsive to said space-chip orthogonalizing filter;
   making a block of symbol decisions responsive to said space-chip orthogonalizing filter;
   forming a subtraction signal as a function of said set of spatial domain parameters, said set of chip domain parameters, and said block of symbol decisions;
   aligning said subtraction signal with said data block;
   subtracting said subtraction signal from said data block to form a modified data block; and
   extracting a data symbol from said modified data block.

25. A smart-antenna multiuser detector system comprising:
   an input coupling adapted to receive a set of demodulated and digitized fractional-chip-sample-streams;
   a data aligner coupled to said input coupling, and adapted to determine a symbol boundary within said fractional-chip-sample-streams and to output a set of symbol-aligned-fractional-chip-sample streams;
   a block former coupled to said data aligner, and adapted to produce a data structure comprising portions of said symbol-aligned-fractional-chip-sample streams;
   a block-output former coupled to said block former, and adapted to receive at least a portion of said data structure and to produce a block of decision-statistic output signals;
   an error function calculator coupled to said block-output former, and adapted to receive said decision-statistic output signals and to compute an error function in response thereto;
   a search direction calculator coupled to block former and said error function calculator, and adapted to compute a search direction based upon a current set of chip domain and spatial domain parameters, and to jointly modify said set of chip domain and spatial domain parameters responsive to said search direction to reduce said error function; and a parameter updater coupled to said search-direction calculator and said block-output former, adapted to update said set of chip domain and spatial domain parameters for reducing said error function, and to provide said updated sets of parameters to said block output former.

26. A multi-user detector system comprising:

a plurality of antennae;

a data structure comprising a set of space-chip samples of a composite CDMA waveform drawn from said plurality of antennae;

a set of chip domain parameters;

a set of spatial domain parameters;

a processor executing a block-adaptive nonlinear optimization algorithm, and adapted to jointly optimize and use said set of spatial domain parameters and said set of chip-domain parameters in a bilinear-orthogonalizing filter, applying said sets of parameters to said data structure, producing a vector of decision statistics sent to a decision device to recover a symbol stream transmitted by a user.

27. The system of claim 26 wherein said decision device is a slicer.

28. The system of claim 26 wherein said decision device is an MLSE sequence estimator.

29. The system of claim 26 further comprising a subtraction unit adapted to subtract from at least a portion of said data structure a matrix-sequence whose elements are outer-products of said sets of parameters, where each outer-product is weighed by the output of said decision device.

* * * * *